(12) United States Patent
Kodera (10) Patent No.: US 9,399,485 B2
(45) Date of Patent: Jul. 26, 2016

(54) ELECTRIC POWER STEERING SYSTEM

(71) Applicant: JTEKT CORPORATION, Osaka-shi, Osaka (JP)

(72) Inventor: Takashi Kodera, Okazaki (JP)

(73) Assignee: JTEKT CORPORATION, Osaka-shi (JP)

(*) Notice: Subject to any disclaimer, the term of this patent is extended or adjusted under 35 U.S.C. 154(b) by 4 days.

(21) Appl. No.: 14/463,906

(22) Filed: Aug. 20, 2014

(65) Prior Publication Data

US 2015/0066303 A1    Mar. 5, 2015

(30) Foreign Application Priority Data

Aug. 29, 2013 (JP) ................................. 2013-178490

(51) Int. Cl.
*B62D 5/04* (2006.01)

(52) U.S. Cl.
CPC .............. *B62D 5/0463* (2013.01); *B62D 5/049* (2013.01)

(58) Field of Classification Search
CPC ............. B62D 6/00; B62D 6/008; B62D 6/10
See application file for complete search history.

(56) References Cited

U.S. PATENT DOCUMENTS

| | | | |
|---|---|---|---|
| 6,694,828 B1* | 2/2004 | Nicot | B62D 1/16 180/422 |
| 2006/0012323 A1* | 1/2006 | Endo | B62D 5/0472 318/432 |
| 2011/0232988 A1* | 9/2011 | Aoki | G01L 25/003 180/446 |

FOREIGN PATENT DOCUMENTS

| | | |
|---|---|---|
| EP | 2272735 A1 | 1/2011 |
| JP | A-2011-203091 | 10/2011 |
| WO | 2007045973 A1 | 4/2007 |

OTHER PUBLICATIONS

Feb. 2, 2015 Extended European Search Report issued in European Application No. 14181838.5.

\* cited by examiner

*Primary Examiner* — James Trammell
*Assistant Examiner* — Adam Mott
(74) *Attorney, Agent, or Firm* — Oliff PLC

(57) ABSTRACT

There is provided an electric power steering system that makes it possible to reduce an uncomfortable feeling given to a driver even when current feedback control is executed in a state where a detected steering torque value is held. The electric power steering system includes a torque sensor that outputs a detection signal corresponding to a steering torque; and a controller that controls driving of a motor. The controller computes a detected steering torque value based on the detection signal from the torque sensor, and executes current feedback control for causing an actual current value of the motor to follow a current command value based on the detected steering torque value. When the detected steering torque value is held, the controller makes a feedback gain of the current feedback control smaller than a feedback gain that is used when the detected steering torque value is not held.

7 Claims, 5 Drawing Sheets

ELECTRIC POWER STEERING SYSTEM

INCORPORATION BY REFERENCE

The disclosure of Japanese Patent Application No. 2013-178490 filed on Aug. 29, 2013 including the specification, drawings and abstract, is incorporated herein by reference in its entirety.

BACKGROUND OF THE INVENTION

1. Field of the Invention

The invention relates to an electric power steering system that assists a vehicle steering operation.

2. Description of the Related Art

A conventional electric power steering system of this type is described in Japanese Patent Application Publication No. 2011-203091 (JP 2011-203091 A). The electric power steering system includes a torque sensor and a controller that controls driving of a motor. The torque sensor includes a Hall IC and a magnetic circuit that applies magnetic flux corresponding to steering torque applied by a driver to the Hall IC. In the electric power steering system, when the steering torque varies in response to a driver's steering operation, the magnetic flux applied from the magnetic circuit to the Hall IC of the torque sensor varies. Thus, a detection signal corresponding to the steering torque is output from the torque sensor. The controller computes the steering torque on the basis of the detection signal from the torque sensor, and computes a current command value on the basis of the detected steering torque value. Then, the controller executes current feedback control for causing an actual current value, which is a value of electric current that is actually supplied to the motor, to follow the current command value to drive the motor, thereby applying assist force to a steering mechanism. In this way, the driver's steering operation is assisted.

The electric power steering system described in JP 2011-203091 A includes a magnetic field generator that periodically applies a magnetic field to the torque sensor, aside from the magnetic circuit. When a magnetic field is applied to the torque sensor through the use of the magnetic field generator, the controller determines whether a detection signal based on the applied magnetic field is output from the torque sensor. When the detection signal based on the applied magnetic field is not output from the torque sensor, the controller determines that a malfunction has occurred in the torque sensor. The controller detects the steering torque on the basis of the detection signal from the torque sensor immediately before the magnetic field is applied to the torque sensor from the magnetic field generator, and the controller continues the current feedback control while holding the detected steering torque value during a period in which the magnetic field is generated from the magnetic field generator.

In the electric power steering system described in JP 2011-203091 A, the current command value is nearly unchanged during a period in which the detected steering torque value is held. If the actual current value of the motor follows the current command value with a high responsiveness, the assist force applied to the steering mechanism is less likely to be changed, and the driver feels a fixed feeling (rigid feeling) in a steering operation. This may be a factor of an uncomfortable feeling given to the driver.

SUMMARY OF THE INVENTION

One object of the invention is to provide an electric power steering system that makes it possible to reduce an uncomfortable feeling given to a driver even when current feedback control is executed in a state where a detected steering torque value is held.

An electric power steering system according to a first aspect of the invention includes:
a motor that applies assist force to a steering mechanism of a vehicle;
a torque sensor that outputs a detection signal corresponding to a steering torque applied to the steering mechanism; and
a controller that computes a detected steering torque value based on the detection signal, and executes current feedback control for causing an actual current value of the motor to follow a current command value based on the detected steering torque value. When the detected steering torque value is held, the controller makes a feedback gain of the current feedback control smaller than a feedback gain that is used when the detected steering torque value is not held.

According to the first aspect, during the period in which the detected steering torque value is held, the feedback gain is smaller than a feedback gain that is used when the detected steering torque value is not held. Thus, the responsiveness of the actual current value of the motor to the current command value is lowered. Therefore, even when the detected steering torque value is held and thus the current command value is less likely to be changed, the actual current value of the motor follows the current command value more moderately than during the period in which the detected steering torque value is not held. Thus, fixation of the output torque from the motor to a constant value is suppressed even during the period in which the detected steering torque value is held, and a smooth operation of the steering mechanism is secured. As a result, it is possible to reduce an uncomfortable feeling given to the driver.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
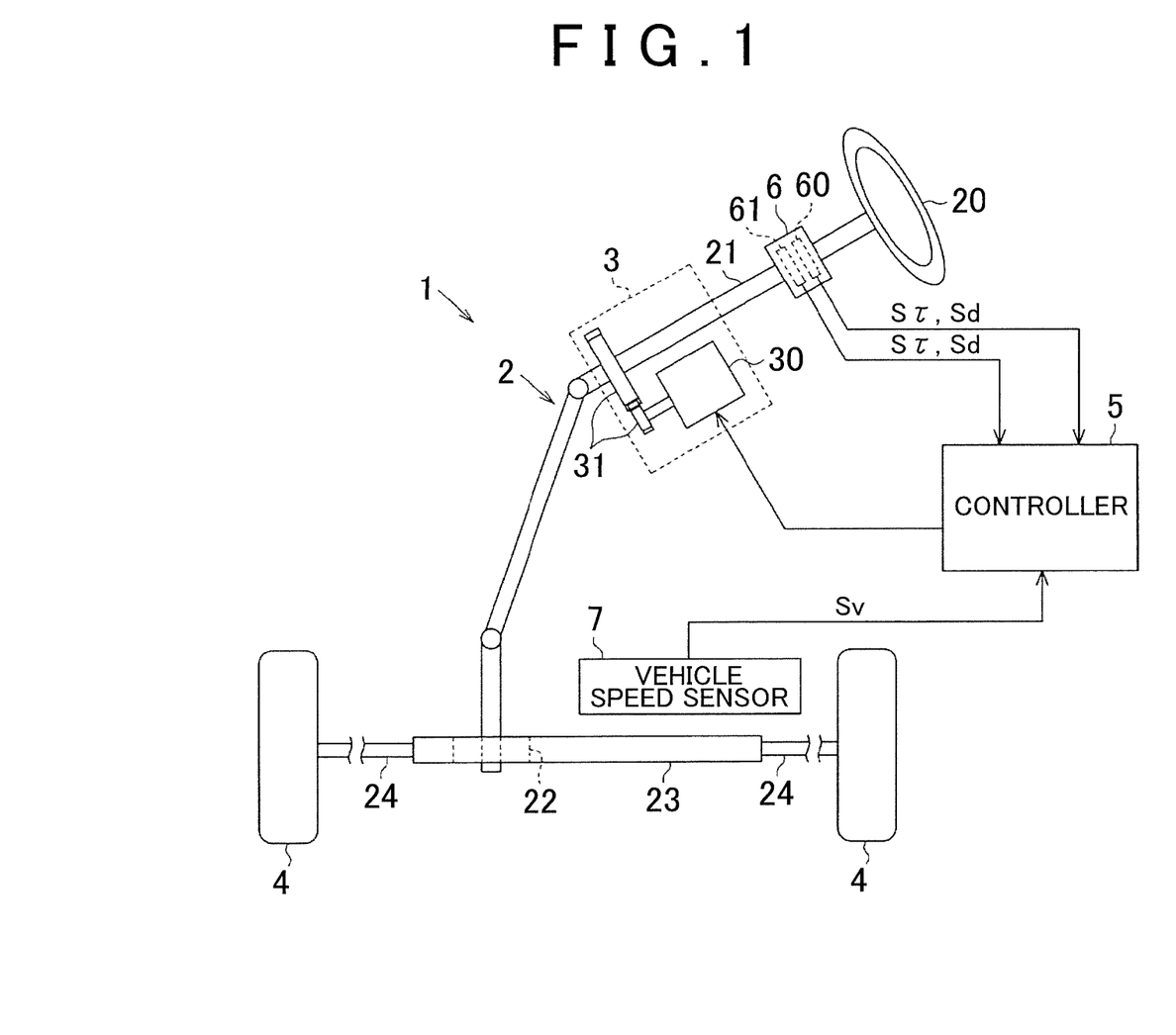
FIG. 1 is a block diagram illustrating the schematic configuration of an electric power steering system according to an embodiment of the invention.

Hereinafter, an embodiment of the invention will be described with reference to the accompanying drawings. As illustrated in FIG. 1, an electric power steering system 1 according to the present embodiment includes a steering mechanism 2 that steers steered wheels 4 in response to a driver's operation of a steering wheel 20, and an assist mechanism 3 that assists the driver's steering operation.

The steering mechanism 2 includes a steering shaft 21, which serves as a rotary shaft of the steering wheel 20, and a rack-and-pinion mechanism 22 disposed at the lower end of the steering shaft 21. The rack-and-pinion mechanism 22 includes a rack shaft 23. In the steering mechanism 2, when the steering shaft 21 rotates in response to the driver's operation of the steering wheel 20, the rotation of the steering shaft 21 is converted into a linear reciprocating motion of the rack shaft 23 in its axial direction by the rack-and-pinion mechanism 22. The linear reciprocating motion of the rack shaft 23 is transmitted to the steered wheels 4 via tie rods 24 connected to respective ends of the rack shaft 23. As a result, the steered angle of the steered wheel 4 is changed and thus the travelling direction of the vehicle is changed.

The assist mechanism 3 includes a motor 30 that applies assist force (assist torque) to the steering shaft 21. A brushed motor is used as the motor 30. The torque output from the motor 30 is transmitted to the steering shaft 21 via a speed reducer 31, so that the assist torque is applied to the steering shaft 21 to assist the steering operation.

The electric power steering system 1 is provided with various sensors that detect an operation amount of the steering wheel 20 and state quantities of the vehicle. For example, the steering shaft 21 is provided with a torque sensor 6. The torque sensor 6 has two sensor ICs 60, 61, which serve as detectors that detect a steering torque applied to the steering shaft 21 by the driver's steering operation. That is, the torque sensor 6 has a redundant design structure in which two sensor ICs are provided. The sensor ICs 60, 61 have the same structure, and each output a voltage signal corresponding to the detected steering torque as a detection signal Sτ. The sensor ICs 60, 61 each output a malfunction diagnosis signal Sd having a predetermined waveform, instead of the detection signals Sτ, when power supply to the sensor ICs 60, 61 is started.

The vehicle is provided with a vehicle speed sensor 7. The vehicle speed sensor 7 detects a travelling speed (vehicle speed) of the vehicle, and outputs a voltage signal corresponding to the detected vehicle speed as a detection signal Sv. The signals output from the sensors 6, 7 are input into a controller 5. The controller 5 controls driving of the motor 30 on the basis of the signals output from the sensors 6, 7.

Figure 2:
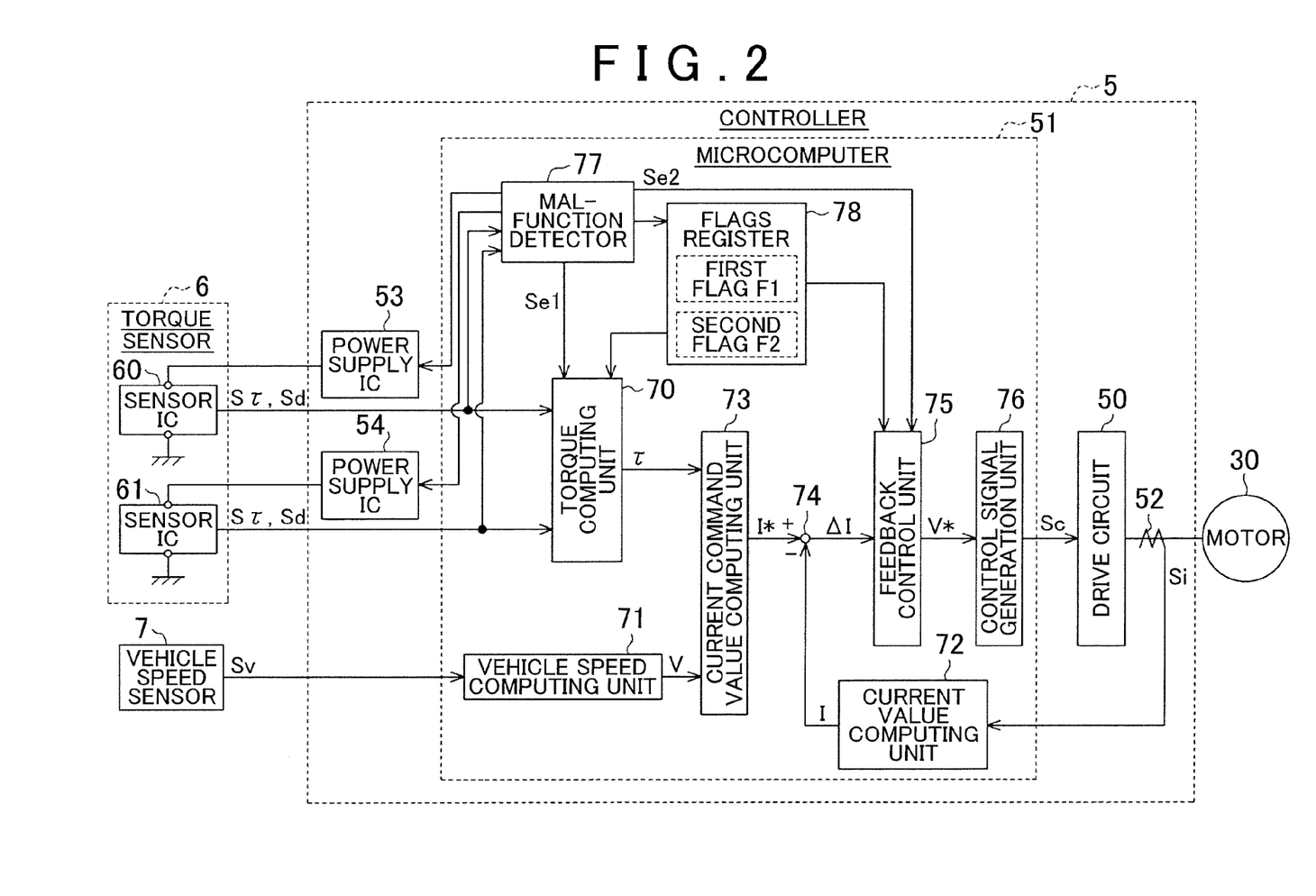
FIG. 2 is a block diagram illustrating the configurations of a controller and a torque sensor of the electric power steering system according to the embodiment.

As illustrated in FIG. 2, the controller 5 includes a drive circuit 50 that supplies driving electric power to the motor 30, a microcomputer 51 that controls driving of the motor 30 through the use of the drive circuit 50, and a current sensor 52 that detects an actual current value, which is a value of electric current that is actually supplied to the motor 30. The current sensor 52 outputs a voltage signal corresponding to the detected actual current value of the motor 30 to the microcomputer 51 as a detection signal Si. In addition to the detection signal Si from the current sensor 52, the detection signals Sτ and the malfunction diagnosis signals Sd output from the sensor ICs 60, 61 of the torque sensor 6 and the detection signal Sv from the vehicle speed sensor 7 are input into the microcomputer 51. The microcomputer 51 generates a control signal Sc based on the signals output from the sensors 6, 7, 52. A pulse width modulation (PWM) signal is used as the control signal Sc. The microcomputer 51 outputs the control signal Sc to the drive circuit 50 to execute PWM control on the drive circuit 50, thereby driving the motor 30.

Next, the drive control on the motor 30, which is executed by the microcomputer 51, will be described in detail. The microcomputer 51 includes a plurality of computing units 70 to 72 that compute various detected values on the basis of the detection signals output from the sensors 6, 7, 52. The torque computing unit 70 computes a detected steering torque value τ on the basis of the detection signals Sτ output from the sensor ICs 60, 61 of the torque sensor 6. The vehicle speed computing unit 71 computes a detected vehicle speed value V on the basis of the detection signal Sv output from the vehicle speed sensor 7. The current value computing unit 72 computes an actual current value I of the motor 30 on the basis of the detection signal Si output from the current sensor 52.

The detected steering torque value τ computed by the torque computing unit 70 and the detected vehicle speed value V computed by the vehicle speed computing unit 71 are input into a current command value computing unit 73. The current command value computing unit 73 computes a current command value I* on the basis of the detected steering torque value τ and the detected vehicle speed value V. The current command value I* is a target value of a current applied to the motor 30. In the present embodiment, the current command value I* corresponds to a target value of the torque output from the motor 30. The current command value computing unit 73 sets the absolute value of the current command value I* to a larger value as the absolute value of the detected steering torque value τ is larger or as the detected vehicle speed value V is lower. The current command value computing unit 73 outputs the computed current command value I* to a subtractor 74.

The subtractor 74 computes a current deviation $\Delta I$ ($=I^*-I$) that is a difference value between the current command value I* computed by the current command value computing unit 73 and the actual current value I of the motor 30 computed by the current value computing unit 72, and outputs the computed current deviation $\Delta I$ to a feedback (F/B) control unit 75.

The feedback control unit 75 executes current feedback control based on the current deviation $\Delta I$. The current feedback control executed by the feedback control unit 75 in the present embodiment is proportional-integral (PI) control. That is, the feedback control unit 75 computes a proportional component by multiplying the current deviation $\Delta I$ by a proportional gain Kp of proportional (P) control, and computes an integral component by multiplying the integration value of the current deviation $\Delta I$ by an integral gain Ki of integral (I) control. The feedback control unit 75 adds together the computed proportional component and integral component to compute a voltage command value V*, and outputs the voltage command value V* to the control signal generation unit 76. The control signal generation unit 76 generates the control signal Sc based on the voltage command value V*, and outputs the generated control signal Sc to the drive circuit 50, thereby executing PWM control on the drive circuit 50. Thus, driving electric power corresponding to the control signal Sc is supplied from the drive circuit 50 to the motor 30, and assist control for applying assist torque to the steering shaft 21 is executed.

The controller 5 includes power supply ICs 53, 54 that supply operating electric power to the sensor ICs 60, 61, respectively. The power supply ICs 53, 54 adjust a voltage supplied from a power supply, such as an in-vehicle battery, to operating voltages suitable for the sensor ICs 60, 61, and apply the adjusted operating voltages to the sensor ICs 60, 61, respectively. Thus, the operating electric power for the sensor ICs 60, 61 is secured. The power supply ICs 53, 54 execute shutoff of power supply and restart of power supply to the sensor ICs 60, 61 based on a command from the microcomputer 51.

Figure 3:
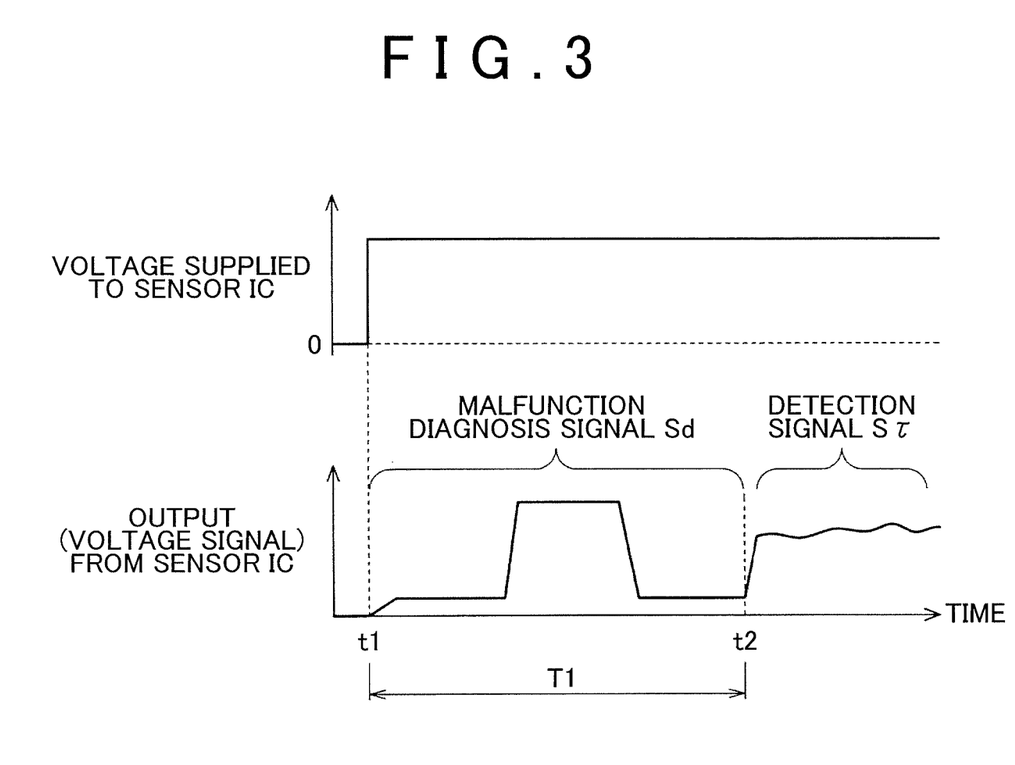
FIG. 3 is a timing chart illustrating transition in the voltage supplied to a sensor IC, and transition in an output from the sensor IC in the torque sensor according to the embodiment.

Next, the operations of the sensor ICs 60, 61 will be described. As illustrated in FIG. 3, when power supply to the sensor ICs 60, 61 is started at time t1, the sensor ICs 60, 61 each output the malfunction diagnosis signal Sd having a predetermined waveform for a predetermined period T1. Then, the sensor ICs 60, 61 each output the detection signal Sτ after time t2 at which the output of the malfunction diagnosis signals Sd is completed.

When some sort of malfunction occurs in any one of the sensor ICs 60, 61, the sensor ICs 60, 61, which is malfunctioning, outputs the malfunction diagnosis signal Sd having a waveform different from the predetermined waveform. Based on this malfunction diagnosis signal Sd, the microcomputer 51 detects occurrence of a malfunction in the sensors ICs 60, 61 on the basis of a change in the malfunction diagnosis signal Sd output from each of the sensor ICs 60, 61.

Next, a method of detecting a malfunction in the sensor ICs 60, 61 and a method of computing the detected steering torque value τ, which are executed by the microcomputer 51, will be described. As illustrated in FIG. 2, the microcomputer 51 includes a malfunction detector 77 that detects malfunctions in the sensor ICs 60, 61 based on the detection signals Sτ and the malfunction diagnosis signals Sd output from the sensor ICs 60, 61. The microcomputer 51 also has a FLAGS register 78 in which a first flag F1 and a second flag F2 are set by the malfunction detector 77.

When the sensor ICs 60, 61 are both operating properly, the malfunction detector 77 compares the detection signals Sτ output from the sensor ICs 60, 61 with each other, thereby monitoring whether a malfunction occurs in the sensor ICs 60, 61. When the sensor ICs 60, 61 are both operating properly, the torque computing unit 70 sequentially computes the detected steering torque value τ based on the detection signals Sτ output from the sensor ICs 60, 61.

As described above when the sensor ICs 60, 61 are both operating properly, as normal control, the controller 5 monitors whether a malfunction occurs in the sensor ICs 60, 61 based on the comparison between the detection signals Sτ output from the sensor ICs 60, 61 while executing the current feedback control based on the detection signals Sτ output from the sensor ICs 60, 61. In the present embodiment, the normal control is first control.

When the malfunction detector 77 detects a malfunction in one of the sensor ICs 60, 61 by executing malfunction detection based on the comparison between the detection signals Sτ, the malfunction detector 77 outputs a malfunction detection signal Se1 indicating the occurrence of the malfunction, to the torque computing unit 70. When receiving the malfunction detection signal Se1 from the malfunction detector 77, the torque computing unit 70 determines the malfunctioning sensor IC among the sensor ICs 60, 61 based on the malfunction detection signal Se1. After this, the torque computing unit 70 computes the detected steering torque value τ based on only the detection signal ST output from the properly operating sensor IC in which no malfunction is detected. When the malfunction detector 77 detects a malfunction in one of the sensor ICs 60, 61, the malfunction detector 77 stops power supply to the sensor IC in which a malfunction is detected, and periodically executes shutoff of power supply and restart of power supply to the normal sensor IC in which no malfunction is detected, through the use of the power supply ICs 53, 54. Thus, the malfunction detector 77 causes the remaining sensor IC, in which no malfunction is detected, to alternately output the detection signal Sτ and the malfunction diagnosis signal Sd, and monitors whether a malfunction occurs in the remaining sensor IC based on the malfunction diagnosis signal Sd.

As described above, when a malfunction is detected in one of the sensor ICs 60, 61, as backup control, the controller 5 monitors whether a malfunction occurs in the remaining sensor IC based on the malfunction diagnosis signal Sd while continuing the current feedback control based on the detection signal Sτ output from the remaining sensor IC in which no malfunction is detected. In the present embodiment, the backup control is second control.

When the sensor ICs 60, 61 are both operating properly, the malfunction detector 77 sets the first flag F1 of the FLAGS register 78 to an off-state. On the other hand, when a malfunction is detected in one of the sensor ICs 60, 61, the malfunction detector 77 sets the first flag F1 to an on-state. Thus, the first flag F1 is set to the off-state during execution of the normal control, whereas the first flag F1 is set to the on-state during execution of the backup control.

Next, the backup control will be described in detail with reference to FIG. 4. Note that, for convenience of explanation, the case where a malfunction is detected in the sensor IC 61 through malfunction detection based on the comparison between the detection signals Sτ and the sensor IC 60 is operating properly will be described as one example.

Figure 4:
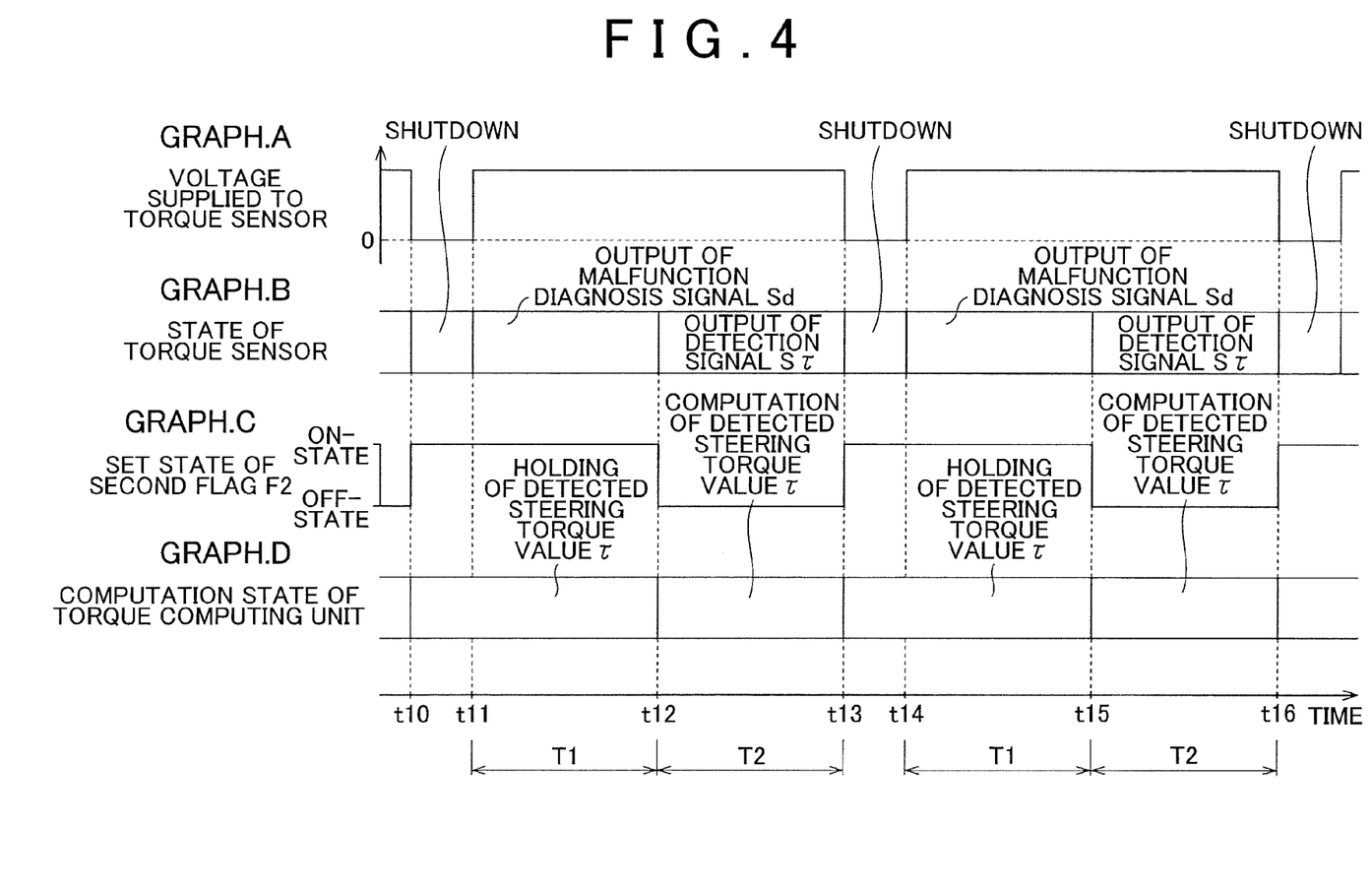
FIG. 4 is a timing chart illustrating graph A: transition in the voltage supplied to the sensor IC in the torque sensor, graph B: transition in the state of the sensor IC, graph C: transition in the set state of a second flag, graph D: transition in the computation state of a torque computing unit according to the embodiment.

As illustrated in graph A in FIG. 4, the malfunction detector 77 temporarily stops the supply of electric power to the sensor IC 60, for example, at time t10 during execution of the backup control, and then restarts the supply of electric power to the sensor IC 60 at time t11. Thus, as illustrated in graph B in FIG. 4, the sensor IC 60 is temporarily shut down and then starts output of the malfunction diagnosis signal Sd. The sensor IC 60 outputs the malfunction diagnosis signal Sd over a period from time t11 at which the supply of electric power is restarted until time t12 at which the predetermined period T1 has elapsed from time t11. At this time, the malfunction detector 77 determines whether the malfunction diagnosis signal Sd output from the sensor IC 60 has a predetermined waveform. The malfunction detector 77 determines that the sensor IC 60 is operating properly when the malfunction diagnosis signal Sd has the predetermined waveform, whereas determines that the sensor IC 60 is malfunctioning when the malfunction diagnosis signal Sd does not have the predetermined waveform.

When the sensor IC 60 is operating properly, as illustrated in graph A and graph B in FIG. 4, the malfunction detector 77 continues supply of electric power to the sensor IC 60 from time t12 to time t13 at which a predetermined period T2 has elapsed from time t12, and thus the sensor IC 60 outputs the detection signal Sτ from time t12 to time t13. The malfunction detector 77 stops the supply of electric power to the sensor IC 60 again at time t13 and then restarts the supply of electric power to the sensor IC 60 at time t14. Thus, the sensor IC is shut down at time t13 and then outputs the malfunction diagnosis signal Sd again at time t14. At this time, the malfunction detector 77 determines again whether the sensor IC 60 is malfunctioning on the basis of the malfunction diagnosis signal Sd output from the sensor IC 60. Then, the malfunction detector 77 alternately causes the sensor IC 60 to output the malfunction diagnosis signal Sd and the detection signal Sτ by periodically executing stopping of the supply of electric power to the sensor IC 60 and restarting of the supply of electric power. The malfunction detector 77 determines whether the sensor IC 60 is malfunctioning each time the sensor IC 60 outputs the malfunction diagnosis signal Sd.

When a malfunction of the sensor IC 60 is detected on the basis of the malfunction diagnosis signal Sd output from the sensor IC 60, the malfunction detector 77 outputs a malfunction detection signal Se2 to the feedback control unit 75 as illustrated in FIG. 2. When the feedback control unit 75 receives the malfunction detection signal Se2 from the malfunction detector 77, the feedback control unit 75 executes fail-safe control, for example, control of stopping the output of the voltage command value V* to the control signal generation unit 76 to stop the motor 30, in order to ensure the safety of the electric power steering system 1.

As illustrated in graph C in FIG. 4, the malfunction detector 77 sets the second flag F2 to an on-state in a period from the time point at which the supply of electric power to the sensor IC is stopped to the time point at which it is confirmed that the output of the detection signal ST from the sensor IC 60 is started. The malfunction detector 77 sets the second flag F2 to an off-state during a period in which the sensor IC 60 outputs the detection signal Sτ. The torque computing unit 70 computes and holds the detected steering torque value τ on the basis of the set state of the second flag F2.

As illustrated in graph D in FIG. 4, the torque computing unit 70 sequentially computes the detected steering torque value τ on the basis of the detection signal Sτ from the sensor IC 60 when the second flag F2 is in the off-state, whereas holds the immediately preceding value of the detected steering torque value τ as the detected steering torque value τ when the second flag F2 is in the on-state. Thus, for example, during the period from time t13 at which the supply of electric power to the sensor IC 60 is stopped to time t15 at which the output of the detection signal Sτ from the sensor IC 60 is started, the detected steering torque value τ is held at the value computed immediately before time t13. Thus, the microcomputer 51 is able to continue current feedback control in both the period in which the sensor IC 60 is shut down and the period in which the malfunction diagnosis signal Sd is output from the sensor IC 60.

Similarly, the backup control described above is executed by the controller 5 when a malfunction is detected in the sensor IC 60 through malfunction detection based on the comparison between the detection signals Sτ during execution of the normal control and the properly operating sensor IC is the sensor IC 61.

During execution of the backup control, the controller 5 in the present embodiment makes a feedback gain of the current feedback control smaller than that during execution of the normal control. Next, a process of changing the feedback gain, which is executed by the feedback control unit 75, will be described with reference to FIG. 5.

Figure 5:
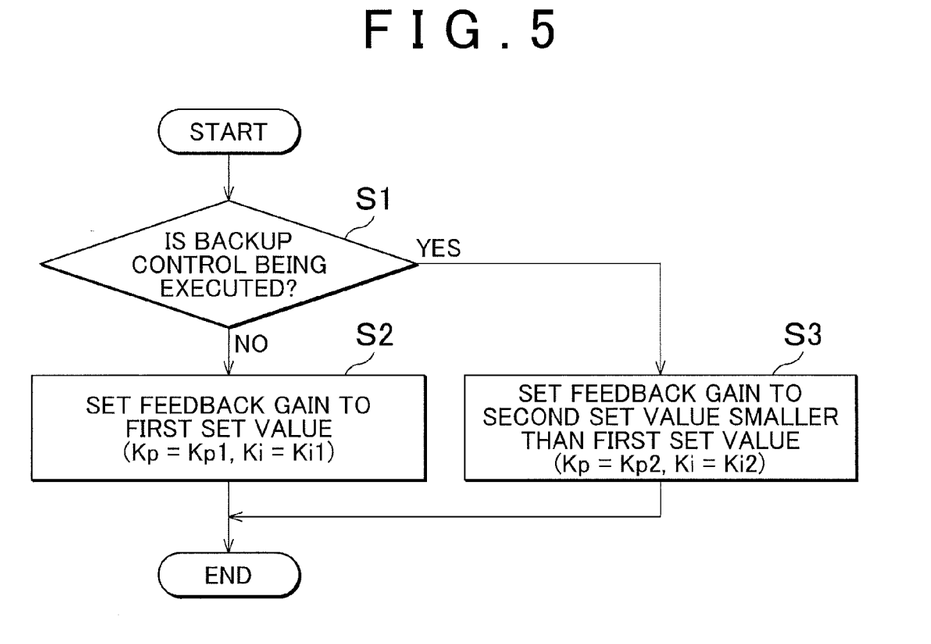
FIG. 5 is a flowchart illustrating the procedure for changing a feedback gain of the current feedback control, which is executed by the controller in the embodiment.

As illustrated in FIG. 5, the feedback control unit 75 determines whether the backup control is being executed based on the set state of the first flag F1 of the FLAGS register 78 (Step S1). When the backup control is not being executed, that is, when the normal control is being executed (Step S1: NO), the feedback control unit 75 sets the feedback gain to a first set value (Step S2). Specifically, the feedback control unit 75 sets a proportional gain Kp to a first proportional gain Kp1 and sets an integral gain Ki to a first integral gain Ki1. On the other hand, when the backup control is being executed (Step S1: YES), the feedback control unit 75 sets the feedback gain to a second set value that is smaller than the first set value. Specifically, the feedback control unit 75 sets the proportional gain Kp to a second proportional gain Kp2 that is smaller than the first proportional gain Kp1 and sets the integral gain Ki to a second integral gain Ki2 that is smaller than the first integral gain Ki1 (Step S3).

Next, the operation of the electric power steering system 1 according to the present embodiment will be described. In the electric power steering system 1 according to the present embodiment, during execution of the backup control, the detected steering torque value τ is maintained constant during a period in which the detected steering torque value τ is held, and thus the current command value I* is nearly unchanged. If the actual current value I of the motor 30 follows such a current command value I* with a high responsiveness in the normal control, the output torque from the motor 30 is less likely to be changed, and there is a possibility that the driver will feel a fixed feeling (rigid feeling) in a steering operation.

However, in the electric power steering system 1 according to the present embodiment, during execution of the backup control, the feedback gain of the current feedback control is smaller than that during execution of the normal control. Thus, the responsiveness of the actual current value I of the motor 30 to the current command value I* is lowered. Therefore, even when the detected steering torque value τ is held and thus the current command value I* is less likely to be changed, the actual current value I of the motor 30 follows the current command value I* more moderately than during execution of the normal control. Thus, fixation of the output torque from the motor 30 to a constant value is suppressed even during a period in which the detected steering torque value τ is held, and a smooth operation of the steering mechanism 2 is secured. As a result, it is possible to reduce an uncomfortable feeling given to the driver.

As described above, the following advantageous effects are obtained by the electric power steering system 1 according to the present embodiment.

1) When a malfunction is detected in one of the two sensor ICs 60, 61, the controller 5 causes the remaining sensor IC, in which no malfunction is detected, to alternately output the detection signal Sτ and the malfunction diagnosis signal Sd. The controller 5 executes the current feedback control based on the detection signal Sτ output from the remaining sensor IC. Further, the controller 5 monitors whether a malfunction occurs in the remaining sensor IC based on the malfunction diagnosis signal Sd while continuing the current feedback control with the detected steering torque value τ held, as the backup control, during a period in which the remaining sensor IC is shut down and a period in which the malfunction diagnosis signal Sd is output from the remaining sensor IC. Thus, during execution of the backup control, it is possible to continue the current feedback control while monitoring whether a malfunction occurs in the remaining sensor IC in which no malfunction is detected.

2) During execution of the backup control, the controller 5 makes the feedback gain of the current feedback control smaller than that during execution of the normal control. Thus, even if the detected steering torque value is held and thus the current command value I* is less likely to be changed, it is possible to secure a smooth operation of the steering mechanism 2. As a result, it is possible to reduce an uncomfortable feeling given to the driver.

3) When making the feedback gain smaller than that during execution of the normal control, the controller 5 makes both the proportional gain Kp used in the proportional (P) control and the integral gain Ki used in the integral (I) control smaller. Thus, it is possible to easily make the feedback gain smaller.

The above-described embodiment may be modified as follows. In the above-described embodiment, when the feedback gain of the current feedback control is made smaller, both the proportional gain Kp and the integral gain Ki are made smaller. Alternatively, either one of the proportional gain Kp and the integral gain Ki may be made smaller.

In the above-described embodiment, PI control is adopted as the current feedback control. Alternatively, PID control may be adopted as the current feedback control. In this case, a derivative gain of derivative (D) control may be made smaller to make the feedback gain of the current feedback control smaller. Any appropriate control other than PID control may be adopted as the current feedback control. That is, the kind of control is not particularly limited as long as the feedback gain of the current feedback control while the backup control is being executed is made smaller than that when the normal control is executed.

In the above-described embodiment, the feedback gain of the current feedback control is made smaller during execution of the backup control. Alternatively, the feedback gain may be made smaller only during a period in which the detected steering torque value τ is held. Specifically, the feedback control unit 75 executes a process illustrated in FIG. 6 instead of the process illustrated in FIG. 5. That is, the feedback control unit 75 determines whether the detected steering torque value τ is held based on the set state of the second flag F2 of the FLAGS register 78 (Step S4). When the detected steering torque value τ is not held (Step S4: NO), that is, when the detected steering torque value τ is computed based on the detection signal Sτ, the feedback control unit 75 sets the feedback gain to the first set value (Step S2). On the other hand, when the detected steering torque value τ is held (Step S4: YES), the feedback control unit 75 sets the feedback gain to the second set value that is smaller than the first set value (Step S3). With this configuration as well as with the configuration in the above-described embodiment, it is possible to reduce an uncomfortable feeling given to the driver.

Figure 6:
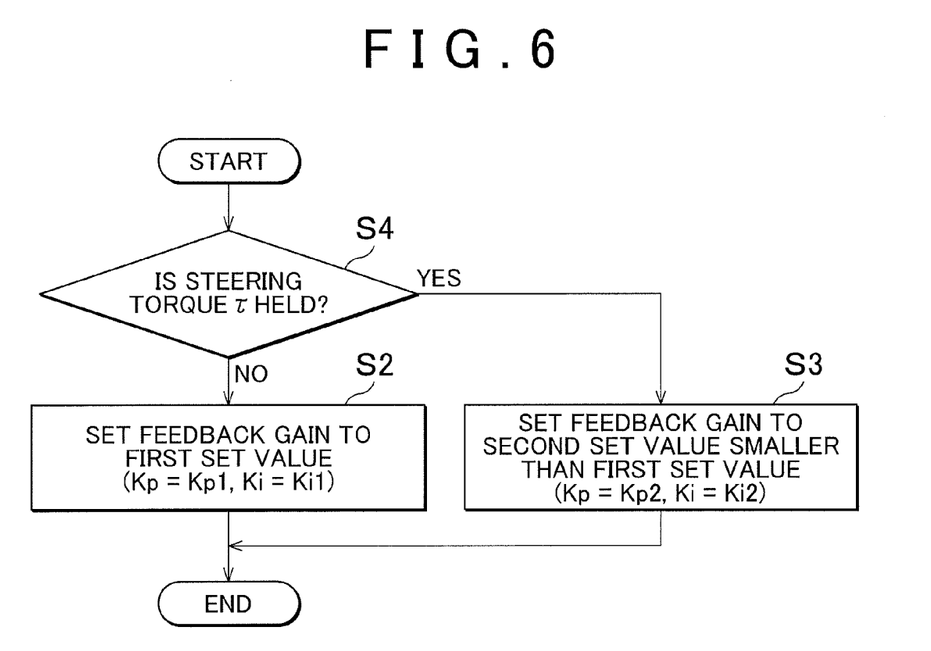
FIG. 6 is a flowchart illustrating the procedure for changing a feedback gain of the current feedback control, which is executed by a controller of an electric power steering system according to another embodiment of the invention.

In the above-described embodiment, the torque sensor 6 has the two sensor ICs 60, 61. Alternatively, the torque sensor 6 may have only one sensor IC. In this case, when the controller 5 executes the same control as the backup control illustrated in FIG. 4 on the one sensor IC of the torque sensor 6, it is possible to maintain continuous execution of the current feedback control and to execute malfunction detection on the sensor IC. At this time, changing of the feedback gain by the controller 5 as illustrated in FIG. 6 is effective.

In the above-described embodiment, a value immediately before power supply to the sensor ICs 60, 61 is shut off is used as the value at which the detected steering torque value τ is held during a period in which the sensor IC is shut down and a period in which the malfunction diagnosis signal Sd is output from the sensor IC. However, in another embodiment, another appropriate value may be used as long as the value is based on the detected steering torque value τ computed in a period in which the detection signals Sτ are output from the sensor ICs 60, 61. For example, the average value of the detected steering torque values τ in a period in which the detection signals Sτ are output may be used.

In the above-described embodiment, the sensor IC 60, 61 spontaneously outputs the malfunction diagnosis signals Sd in response to the starting of the supply of electric power to the sensor ICs 60, 61. However, the configuration for causing the sensor ICs 60, 61 to output the malfunction diagnosis signals Sd may be changed as needed. For example, the sensor ICs 60, 61 may output the malfunction diagnosis signals Sd based on a command from the microcomputer 51. In this case, because it is not necessary to shut down the sensor ICs 60, 61, the detected steering torque value τ needs to be held only during the period in which the malfunction diagnosis signals Sd are output from the sensor ICs 60, 61. That is, the controller 5 needs to hold the detected steering torque value τ during at least the period in which the malfunction diagnosis signals Sd are output from the sensor ICs 60, 61.

In the above-described embodiment, the sensor ICs 60, 61 output the malfunction diagnosis signals Sd and the detection signals ST. However, the sensor ICs 60, 61 may output only the detection signals Sτ. When the sensor ICs 60, 61 output only the detection signals Sτ, the controller 5 may detect malfunction of peripheral circuits of the torque sensor 6, for example, malfunctions of the power supply ICs 53, 54 as malfunctions of the sensor ICs 60, 61. In this case, the controller 5 may hold the detected steering torque value τ during a period in which it is determined whether a malfunction occurs in the power supply ICs 53, 54. In the controller 5, executing the process illustrated in FIG. 6 is effective.

In the above-described embodiment, the current command value I* is set based on the detected steering torque value τ and the detected vehicle speed value V. However, the current command value I* may be set based on only, for example, the detected steering torque value τ.

In the above-described embodiment, the controller 5 executes the normal control and the backup control. Alternatively, the control executed by the controller 5 is not limited to the normal control and the backup control as long as the controller 5 executes first control in which current feedback control is executed while the computation of the detected steering torque value τ is continued and second control in which current feedback control is executed while computation of the detected steering torque value τ and holding of the detected steering torque value τ are alternately executed, and, during execution of the second control, the controller 5 makes the feedback gain of the current feedback control smaller than that when executing the first control.

In the above-described embodiment, the microcomputer 51 has the torque computing unit 70. However, each of the sensor ICs 60, 61 may have a torque computing unit. In this case, the control unit is formed of the torque computing units of the sensor ICs 60, 61 and the microcomputer 51.

In the above-described embodiment, a brushed motor is used as the motor 30. Alternatively, a brushless motor may be used as the motor 30. The electric power steering system 1 according to the above-described embodiment is an electric power steering system that applies assist torque to the steering shaft 21. However, the invention may be applied to, for example, an electric power steering system that applies assist force to the rack shaft 23.

What is claimed is:
1. An electric power steering system comprising:
a motor that applies assist force to a steering mechanism of a vehicle;
a torque sensor that outputs a detection signal corresponding to a steering torque applied to the steering mechanism; and
a controller that computes a detected steering torque value based on the detection signal, and executes current feedback control for causing an actual current value of the motor to follow a current command value based on the detected steering torque value, wherein:
when the detected steering torque value is held at a past value, the controller makes a feedback gain of the current feedback control smaller than a feedback gain that is used when the detected steering torque value is not held,
the torque sensor alternately outputs a malfunction diagnosis signal and the detection signal, the malfunction diagnosis signal is based on a determination of a malfunction of the torque sensor,
the controller detects the malfunction of the torque sensor on a basis of the malfunction diagnosis signal, and at least during a period in which the malfunction diagnosis signal is output from the torque sensor, the controller holds the detected steering torque value as the held past value.

2. The electric power steering system according to claim 1, wherein:
the controller executes proportional-integral control as the current feedback control; and
the controller makes at least one of a proportional gain used in proportional control and an integral gain used in integral control smaller to make the feedback gain smaller.

3. The electric power steering system according to claim 1, wherein:
the controller executes proportional-integral control as the current feedback control; and
the controller makes at least one of a proportional gain used in proportional control and an integral gain used in integral control smaller to make the feedback gain smaller.

4. An electric power steering system comprising:
a motor that applies assist force to a steering mechanism of a vehicle;
a torque sensor that outputs a detection signal corresponding to a steering torque applied to the steering mechanism; and
a controller that computes a detected steering torque value based on the detection signal, and executes current feedback control for causing an actual current value of the motor to follow a current command value based on the detected steering torque value, wherein
the controller switches a control mode between first control in which the current feedback control is executed based on a detected steering torque value that is sequentially computed, and second control in which the current feedback control is executed based on at least a held detected steering torque value, the second control during a first period in which the detected steering torque value is held constant and a second period in which the detected steering torque value is computed, wherein the first period and the second period are alternately repeated at the second control, and
when the second control is being executed, the controller makes a feedback gain of the current feedback control smaller than a feedback gain that is used when the first control is being executed, wherein:
the torque sensor alternately outputs a malfunction diagnosis signal and the detection signal, the malfunction diagnosis signal is based on a determination of a malfunction of the torque sensor, the controller detects the malfunction of the torque sensor on a basis of the malfunction diagnosis signal, and
at least during a period in which the malfunction diagnosis signal is output from the torque sensor, the controller holds the detected steering torque value as the held detected steering torque value.

5. The electric power steering system according to claim 4, wherein:
the torque sensor has two detectors, each of the two detectors being configured to output the detection signal;
each of the two detectors is able to alternately output a malfunction diagnosis signal and the detection signal, the malfunction diagnosis signal is based on a determination that at least one of the two detectors is malfunctioning;
when the two detectors are both operating properly, as the first control, the controller executes the current feedback control while computing the detected steering torque value based on the detection signal output from at least one of the two detectors, and monitors whether a malfunction occurs in the two detectors based on a comparison between the detection signal output from each of the two detectors; and
when a malfunction is detected in one of the two detectors, as the second control, the controller makes the second of the two detectors, in which no malfunction is detected, to alternately output the detection signal and the malfunction diagnosis signal, continues the current feedback control while holding the detected steering torque value at least during a period in which the malfunction diagnosis signal is output from the second of the two detectors, and monitors whether a malfunction occurs in the second of the two detectors based on the malfunction diagnosis signal.

6. The electric power steering system according to claim 4, wherein:
the controller executes proportional-integral control as the current feedback control; and
the controller makes at least one of a proportional gain used in proportional control and an integral gain used in integral control smaller to make the feedback gain smaller.

7. The electric power steering system according to claim 5, wherein:
the controller executes proportional-integral control as the current feedback control; and
the controller makes at least one of a proportional gain used in proportional control and an integral gain used in integral control smaller to make the feedback gain smaller.

* * * * *